(12) United States Patent
Sato et al.

(10) Patent No.: US 10,442,305 B2
(45) Date of Patent: Oct. 15, 2019

(54) VEHICLE CONTROL SYSTEM

(71) Applicant: HONDA MOTOR CO., LTD., Tokyo (JP)

(72) Inventors: Masashi Sato, Wako (JP); Shinichi Ueda, Wako (JP); Takashi Ito, Wako (JP); Yujiro Koda, Wako (JP); Satoshi Suda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/032,329

(22) Filed: Jul. 11, 2018

(65) Prior Publication Data

US 2019/0016229 A1 Jan. 17, 2019

(30) Foreign Application Priority Data

Jul. 13, 2017 (JP) .................................. 2017-136890

(51) Int. Cl.
*B60L 58/14* (2019.01)
*B60L 11/18* (2006.01)
*B60R 16/03* (2006.01)

(52) U.S. Cl.
CPC ........... *B60L 11/1851* (2013.01); *B60L 58/14* (2019.02); *B60R 16/03* (2013.01); *B60L 2240/54* (2013.01); *B60L 2240/547* (2013.01); *B60L 2240/549* (2013.01)

(58) Field of Classification Search
CPC .. B60L 58/14; B60L 2240/54; B60L 11/1851; B60R 16/0315; B60R 2016/0322; H02H 3/087
See application file for complete search history.

(56) References Cited

U.S. PATENT DOCUMENTS 6,262,537 B1 * 7/2001 Matsumoto ............ B60Q 1/143
307/10.8
6,791,207 B2 * 9/2004 Yoshida ............... B60R 16/0315
307/10.1
8,339,139 B2 * 12/2012 Barrenscheen ....... G01R 31/327
324/418

FOREIGN PATENT DOCUMENTS

JP 2015-93634 A 5/2015

OTHER PUBLICATIONS

Office Action dated Mar. 26, 2019, issued in counterpart JP Application No. 2017-136890, with English machine translation. (4 pages).

* cited by examiner

*Primary Examiner* — Rina I Duda
(74) *Attorney, Agent, or Firm* — Westerman, Hattori, Daniels & Adrian, LLP

(57) ABSTRACT

A system includes; a first power line connectable with a first fuse and feeds electric power from a battery to a controller; a second power line connectable with a second fuse and feeds electric power from the battery to the controller; a first detector that detects whether the first fuse is connected; a second detector that detects whether the second fuse is connected; and the controller that causes specific equipment to operate upon detection of receipt of a signal by a receiver that operates intermittently to receive signals from a mobile terminal. The controller sets a cycle of operation of the receiver to a first cycle when the first fuse is connected, and set the cycle of operation of the receiver to a second cycle longer than the first cycle, when it is detected that the first fuse is not connected, and the second fuse is connected.

11 Claims, 9 Drawing Sheets

| | FACTORY DEFAULT SETTINGS | CAR DEALER (SECOND MODE) | NORMAL STATE (FIRST MODE) |
|---|---|---|---|
| FIRST FUSE | DISCONNECTED (DETACHED) | DISCONNECTED (DETACHED) | CONNECTED (ATTACHED) |
| SECOND FUSE | DISCONNECTED (DETACHED) | CONNECTED (ATTACHED) | CONNECTED OR DISCONNECTED (ATTACHED OR DETACHED) |

VEHICLE CONTROL SYSTEM

CROSS-REFERENCE OF RELATED APPLICATION

This application claims priority of Japanese Patent Application No. 2017-136890 filed in Japan on Jul. 13, 2017, the entire contents of which are incorporated herein by reference.

TECHNICAL FIELD

The present invention relates to a vehicle control system.

BACKGROUND OF THE INVENTION

Conventionally, a system has been disclosed (see Japanese Patent Application Publication No. 2015-93634, for example) in which periodic start control of a reception circuit of Smart Entry control means by a battery is stopped, on condition that a control circuit detects disconnection of a backup fuse that electrically interrupts a feed line from the battery to a general load. With the control described above, the system can restrict an unnecessary dark current in the reception circuit of the Smart Entry control means by completely stopping operation of the reception circuit, even when the vehicle is unused for a long period of time. Thus, the system prevents deterioration of the battery, and contributes to extension of battery life.

However, since the above system stops operation of the reception circuit of the Smart Entry control means completely, remote control of the vehicle is disabled. This decreases user convenience in some cases.

In view of the foregoing, three is a need to provide a vehicle control system that can suppress power consumption without decreasing user convenience.

SUMMARY OF THE INVENTION (1): A vehicle control system according to one embodiment of the present invention including: a first power line that is connectable with a first fuse and feeds electric power from a battery to a controller; a second power line that is connectable with a second fuse and feeds electric power from the battery to the controller; a first detector that detects whether the first fuse is connected to the first power line; a second detector that detects whether the second fuse is connected to the second power line; a receiver that operates intermittently to receive signals from a mobile terminal in a cycle of a preset period of time; and the controller that causes specific equipment of a vehicle to operate upon detection of receipt of the signal by the receiver, in which the controller is configured to set a cycle of operation of the receiver to a first cycle when the first detector detects that the first fuse is connected to the first power line, and set the cycle of operation of the receiver to a second cycle longer than the first cycle, when it is detected that the first fuse is not connected to the first power line, and the second detector detects that the second fuse is connected to the second power line.

(2): In (1), the specific equipment of the vehicle includes a load controller connected to the first power line, and if the receiver receives a signal from the mobile terminal when the cycle of operation of the receiver is set to the second cycle, the controller causes electric power to be supplied to the load controller connected to the first power line, from the second power line.

(3): In (1) or (2), if the receiver receives a signal from the mobile terminal when the cycle of operation of the receiver is set to the second cycle, the controller sets the cycle of operation of the receiver to a cycle shorter than the second cycle.

(4): In (3), if a state where no signal is received from the mobile terminal continues for a predetermined time or longer after setting the cycle of operation of the receiver to the cycle shorter than the second cycle, the controller sets the cycle of operation of the receiver to the second cycle.

(5): A vehicle control system including: a first power line that is connectable with a first fuse and feeds electric power from a battery to a controller; a second power line that is connectable with a second fuse and feeds electric power from the battery to the controller; a first detector that detects whether the first fuse is connected to the first power line; a second detector that detects whether the second fuse is connected to the second power line; a transmitter that intermittently transmits request signals to the outside of a vehicle; a receiver that receives a signal as a response to the request signal from a mobile terminal; and the controller that causes specific equipment of the vehicle to operate upon receipt of the signal by the receiver, in which the controller is configured to set a cycle of intermittent transmission of request signals to the outside of the vehicle by the transmitter to a third cycle when the first detector detects that the first fuse is connected to the first power line, and set the cycle of the intermittent transmission of request signals to the outside of the vehicle by the transmitter to a fourth cycle longer than the third cycle, when it is detected that the first fuse is not connected to the first power line, and the second detector detects that the second fuse is connected to the second power line.

(6): In (5), the receiver operates intermittently while request signals are transmitted by the transmitter; and when the cycle of transmission of request signals by the transmitter is set to the fourth cycle, the controller sets a cycle of operation of the receiver to a sixth cycle longer than a fifth cycle that was set when the cycle of transmission of request signals by the transmitter was set to the third cycle.

(7): In (5) or (6), the specific equipment of the vehicle includes a load controller connected to the first power line, and if the receiver receives a signal from the mobile terminal when the cycle of transmission of request signals by the transmitter is set to the fourth cycle, the controller causes electric power to be supplied to the load controller connected to the first power line, from the second power line.

(8): In (5) to (7), if the receiver receives a signal from the mobile terminal when the cycle of transmission of request signals by the transmitter is set to the fourth cycle, the controller sets the cycle of transmission of request signals by the transmitter to a cycle shorter than the fourth cycle.

(9): In (8), if a state where no signal is received from the mobile terminal continues for a predetermined time or longer after setting the cycle of transmission of request signals by the transmitter to the cycle shorter than the fourth cycle, the controller sets the cycle of transmission of request signals by the transmitter to the third cycle.

(10): In (2) or (7), if a state where there is no user operation of a control target of the load controller continues for a predetermined time or longer when electric power is supplied to the load controller from the second power line, the controller stops the supply of electric power to the load controller from the second power line.

(11): (1) to (10) further including a relay line that includes a relay circuit provided in the first power line between a part where the first fuse is connectable and the controller, and in the second power line between a part where the second fuse is connectable and the controller, in which: the specific equipment includes a load controller connected to the first power line between the part where the first fuse is connectable and the controller; and the relay circuit is controlled and turned on, to allow supply of electric power to the load controller connected to the first power line from the second power line.

Effect of the Invention

According to (1) or (11), the cycle of operation of the receiver is set to the second cycle longer than the first cycle. Hence, power consumption can be suppressed without decreasing user convenience.

According to (2), if the receiver receives a signal when the cycle of operation of the receiver is set to the second cycle, electric power can be supplied to the specific equipment. Hence, the user can check the operation of the specific equipment, and user convenience can be improved.

According to (3), if the receiver receives a signal when the cycle of operation of the receiver is set to the second cycle, the cycle of receiving signals is reduced. Hence, signal reception sensitivity can be automatically enhanced.

According to (4), when a state where no signal is received continues for a predetermined time or longer, the cycle of operation of the receiver is set to the second cycle. Hence, the user can suppress power consumption without any special operation.

According to (5) or (11), the cycle of intermittent transmission of request signals to the outside of the vehicle is set to the fourth cycle longer than the third cycle. Hence, power consumption can be suppressed without decreasing user convenience.

According to (6), the cycle of transmission of request signals is extended, and the cycle of intermittent reception of signals is also extended. Hence, power consumption can be suppressed even more.

According to (7), if the receiver receives a signal when the cycle of transmission of request signals by the transmitter is set to the fourth cycle, electric power can be supplied to the specific equipment. Hence, the user can check the operation of the specific equipment, and user convenience can be improved.

According to (8), if the receiver receives a signal when the cycle of transmission of request signals by the transmitter is set to the fourth cycle, the cycle of transmission of request signals by the transmitter is set to a cycle shorter than the fourth cycle. Hence, the mobile terminal can receive request signals more easily.

According to (9), if a state where no signal is received continues for a predetermined time or longer after setting the cycle of transmission of request signals by the transmitter to the cycle shorter than the fourth cycle, the cycle of transmission of request signals by the transmitter is set to the third cycle. Hence, the user can suppress power consumption without any special operation.

According to (10), if a state where there is no user operation of a control target of the load controller continues for a predetermined time or longer when electric power is supplied to the load controller, the supply of electric power is stopped. Hence, the user can suppress power consumption without any special operation.

DETAILED DESCRIPTION OF EMBODIMENTS OF THE INVENTION

Hereinafter, embodiments of a vehicle control system of the present invention will be described with reference to the drawings.

First Embodiment

[Configuration]

Figure 1:
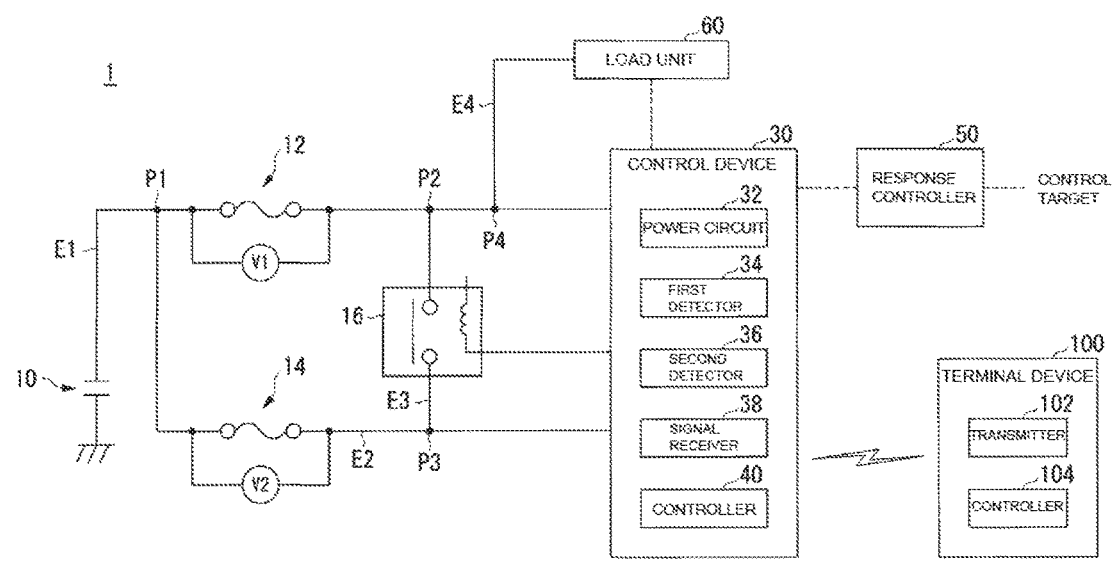
FIG. 1 is a diagram illustrating one example of a functional configuration of a vehicle control system 1 installed in a vehicle.

FIG. 1 is a diagram illustrating one example of a functional configuration of a vehicle control system 1 installed in a vehicle. For example, the vehicle control system 1 includes a first voltage detector V1, a second voltage detector V2, a battery 10, a first fuse 12, a second fuse 14, a relay circuit 16, a control device 30, a response controller 50, a load unit (specific equipment) 60, and a mobile terminal 100. The vehicle control system 1 also has a first feed line E1, a second feed line E2, a third feed line E3, and a fourth feed line E4.

The battery 10, the first fuse 12, the first voltage detector V1, and the control device 30 are connected to the first feed line E1. The second fuse 14, the second voltage detector V2, and the control device 30 are connected to the second feed line E2. The relay circuit 16 is connected to the third feed line E3. The load unit 60 is connected to the fourth feed line E4.

In the first feed line E1, one end of the battery 10 is connected to the ground, and the other end is connected to the control device 30. In the first feed line E1, the first fuse 12 is connected between the battery 10 and the control device 30. Additionally, in the first feed line E1, a meeting point P1 is provided between the battery 10 and the first fuse 12. In addition, in the first feed line E1, a meeting point P2 and a meeting point P4 are provided between the first fuse 12 and the control device 30. The meeting point P2 is provided closer to the first fuse 12 than the meeting point P4.

One end of the second feed line E2 is connected to the meeting point P1, and the other end is connected to the control device 30. Additionally, in the second feed line E2, the second fuse 14 is connected between the meeting point P1 and the control device 30. In addition, in the second feed line E2, a meeting point P3 is provided between the second fuse 14 and the control device 30.

One end of the third feed line E3 is connected to the meeting point P2, and the other end is connected to the meeting point P3. One end of the fourth feed line E4 is connected to the meeting point P4, and the other end is connected to the load unit 60.

The battery 10 is a lead-acid battery or the like having a predetermined voltage (e.g., 12V) as a rated voltage, for example. The first fuse 12 or the second fuse 14 is a fuse that is connected and disconnected to and from the feed line by a user. The relay circuit 16 is a circuit that is controlled and brought into conduction according to a control signal output by the control device 30. The first voltage detector V1 detects a voltage applied to the first fuse 12, and outputs the detection result to the control device 30. The second voltage detector V2 detects a voltage applied to the second fuse 14, and outputs the detection result to the control device 30.

The control device 30 is connected to the response controller 50 and the load unit 60 through a communication line.

The control device 30 acquires an operation state or control state of the response controller 50 or the load unit 60.

The control device 30 includes a power circuit 32, a first detector 34, a second detector 36, a signal receiver 38, and a controller 40, for example. For example, the first detector 34, the second detector 36, and the controller 40 are implemented by executing a program or the like stored in a storage device by a processor such as a CPU (Central Processing Unit). Additionally, some or all of the functional parts may be implemented by hardware such as an LSI (Large Scale Integrated Circuit), an ASIC (Application Specific Integrated Circuit), an FPGA (Field-Programmable Gate Array), and a GPU (Graphics Processing Unit), or may be implemented by a combination of software and hardware. The storage device is implemented by a ROM (Read Only Memory), an HDD (Hard Disk Drive), a flash memory, and an SD card, a RAM (Random Access Memory), or a register, for example.

The power circuit 32 supplies a current supplied from the battery 10 to the signal receiver 38.

The first detector 34 detects whether the first fuse 12 is in a connected state, based on the detection result of the first voltage detector V1. For example, the first detector 34 determines that the first fuse 12 is not connected to the first feed line E1, when a voltage detected by the first voltage detector V1 is not within a first range.

The second detector 36 detects whether the second fuse 14 is in a connected state, based on the detection result of the second voltage detector V2. For example, the second detector 36 determines that the second fuse 14 is not connected to the second feed line E2, when a voltage detected by the second voltage detector V2 is not within a second range.

The signal receiver 38 acquires a transmission signal transmitted by the mobile terminal 100, performs processing such as amplification and decoding on the acquired transmission signal, and outputs information contained in the transmission signal to the controller 40.

The controller 40 controls the signal receiver 38 based on the detection result of the first detector 34 or the second detector 36. Details will be described later. Upon acquisition of a predetermined signal from the control device 30, the response controller 50 controls a control target (e.g., door lock unit or lighting part) to cause the vehicle to perform a predetermined operation. The control target is another example of "specific equipment." Note that the function of the response controller 50 may be a function of the controller 40.

The load unit 60 includes a load and a load controller. The load is electric equipment such as meters, audio, a car navigation system, or a wiper, for example. The load controller controls the load.

The mobile terminal 100 is a single-purpose terminal device such as an electronic key (key fob: FOB). The mobile terminal 100 may be a cellular phone such as a smartphone, a tablet terminal, or the like to which the aforementioned function is assigned by installing an application program. The mobile terminal 100 includes a button battery or the like, for example, and is operated by electric power supplied from the button battery or the like.

The mobile terminal 100 includes a transmitter 102 and a controller 104, for example. The transmitter 102 transmits a transmission signal to the control device 30, according to an instruction of the controller 104. The controller 104 causes the transmitter 102 to transmit a transmission signal based on a user's operation.

[Processing 1]

Figure 2:
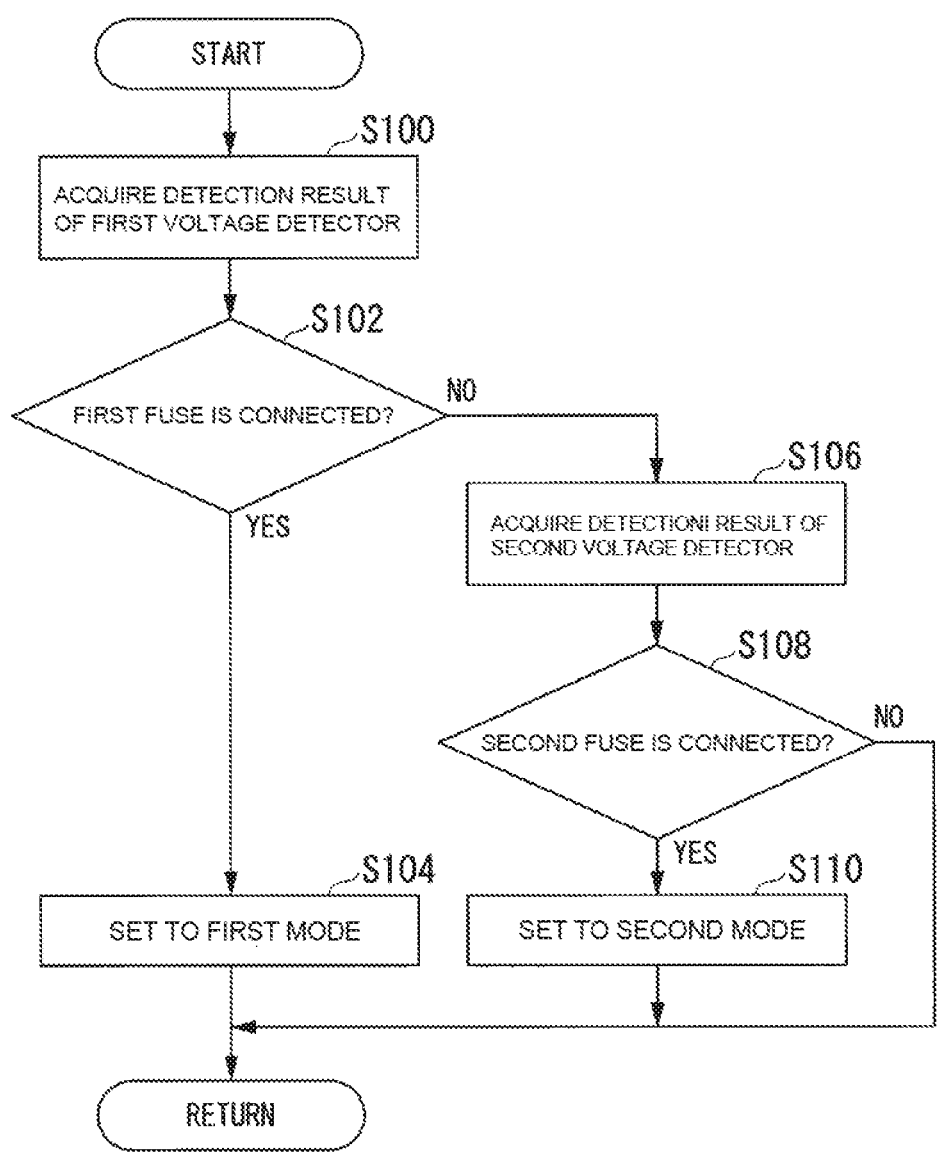
FIG. 2 is a flowchart illustrating a flow of processing performed by a control device 30.

FIG. 2 is a flowchart illustrating a flow of processing performed by the control device 30. Note that in the processing, the second fuse 14 is connected to the second feed line E2, and electric power is supplied to the control device 30 from the battery 10.

First, the first detector 34 acquires the detection result of the first voltage detector V1 (step S100). Next, the first detector 34 determines whether the first fuse 12 is connected to the first feed line E1, based on the detection result of the first voltage detector V1 (step S102).

If the first fuse 12 is connected to the first feed line E1, the controller 40 sets the operation of the signal receiver 38 to first mode (step S104). First mode is a mode in which the cycle of operation of the signal receiver 38 is a first cycle T1 (a preset first period of time). Operation of the signal receiver 38 refers to a state where the signal receiver 38 is brought into conduction and is capable of receiving signals. The aforementioned state of the vehicle control system 1 illustrated in FIG. 1 is one example of a state where the first fuse 12 is connected to the first feed line E1.

If the first fuse 12 is not connected to the first feed line E1, the second detector 36 acquires the detection result of the second voltage detector V2 (step S106). Next, the second detector 36 determines whether the second fuse 14 is connected to the second feed line E2, based on the detection result of the second voltage detector V2 (step S108). If the second fuse 14 is not connected to the second feed line E2, processing of one routine of the flowchart is terminated. Additionally, in this case, since electric power is not originally supplied to the control device 30, the controller 40 may determine that there is a certain abnormality in the vehicle control system 1, for example.

If the second fuse 14 is connected to the second feed line E2, the controller 40 sets the operation of the signal receiver 38 to second mode (step S110). Second mode is a mode in which the cycle of operation of the signal receiver 38 is a second cycle T2 longer than the first cycle T1. Note that first mode and second mode will be described with reference to later-mentioned FIG. 4. Thus, processing of one routine of the flowchart is terminated.

Note that although the determinations on whether the first fuse 12 is connected and whether the second fuse 14 is connected are made in this order in the aforementioned flowchart of FIG. 2, the determinations on whether the second fuse 14 is connected and whether the first fuse 12 is connected may be made in this order instead.

[Configuration where First Fuse is Disconnected]

Figure 3:
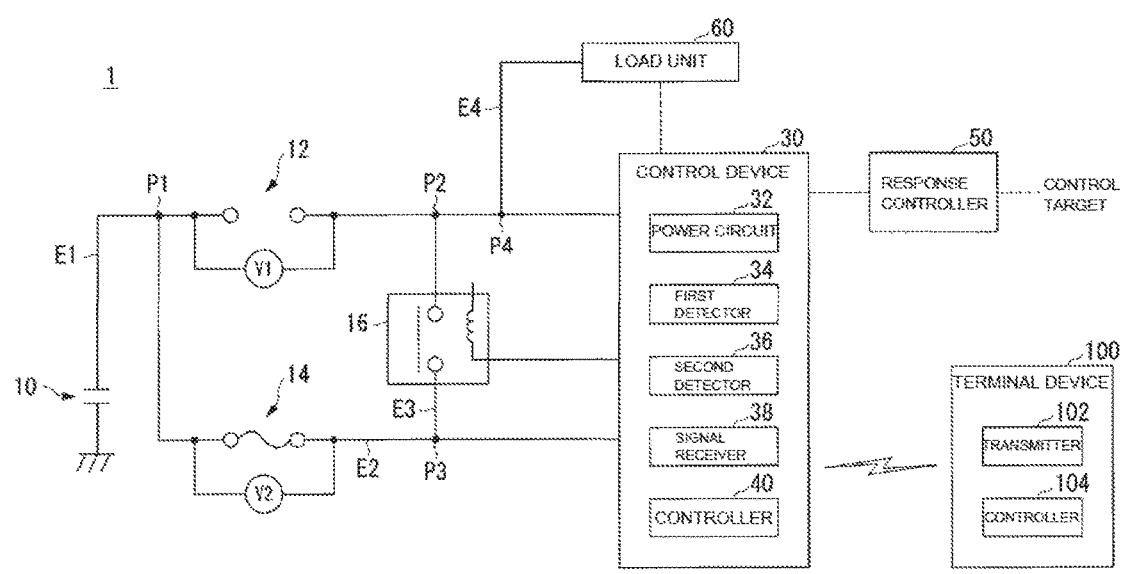
FIG. 3 is a diagram illustrating one example of a state where a first fuse 12 is disconnected and a second fuse 14 is connected.

FIG. 3 is a diagram illustrating one example of a state where the first fuse 12 is disconnected and the second fuse 14 is connected. In other words, FIG. 3 illustrates one example in which second mode is set. Note that the relay circuit is disconnected. Unlike the state illustrated in FIG. 1, a current supplied by the battery 10 is not supplied to the fourth feed line E4 connected to the load unit 60, in the state illustrated in FIG. 3. Accordingly, the current supplied by the battery 10 is suppressed.

Additionally, in the state of FIG. 3, the current supplied by the battery 10 is supplied to the control device 30. Hence, upon detection of a transmission signal transmitted by the mobile terminal 100, the controller 40 causes the response controller 50 to perform certain control. Certain control refers to control for operating specific equipment, such as control for unlocking (or locking) a door lock, and control for unlocking (or locking) a trunk. Certain control also refers to control for lighting and flashing a lighting part of the vehicle, and control for causing a speaker to output voice (answer back), for example. This notifies the user that the vehicle has responded to the transmission signal transmitted by the mobile terminal 100.

[Control of Relay Circuit]

Furthermore, upon receipt of a transmission signal from the mobile terminal 100, the controller 40 performs control to bring the relay circuit into conduction. With this, electric power supplied by the battery 10 is supplied to the load unit 60 through the second feed line E2, the third feed line E3, the first feed line E1, and the fourth feed line E4. As a result, the load controller can control the load, whereby the user can check functions of the vehicle.

Additionally, after the controller 40 performs control to bring the relay circuit into conduction (after supplying electric power to load unit 60), when there is no user operation of the load (control target) of the load controller included in the load unit 60 for a predetermined time or longer, the controller performs control to bring the relay circuit out of conduction, and stops the supply of electric power to the load unit 60. Accordingly, power consumption is suppressed when there is no user operation.

[Second Mode]

Figure 4:
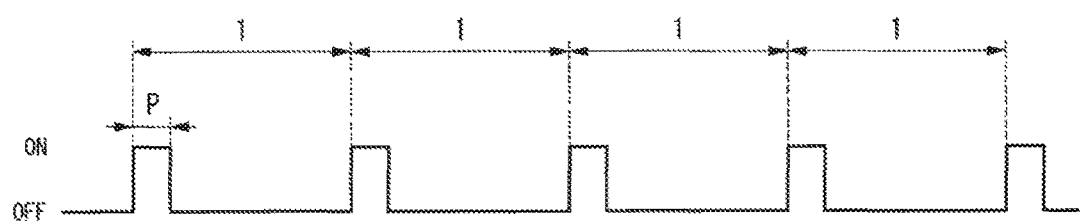
FIG. 4 is a diagram illustrating a first cycle T1 and a second cycle T2.
Figure 4:
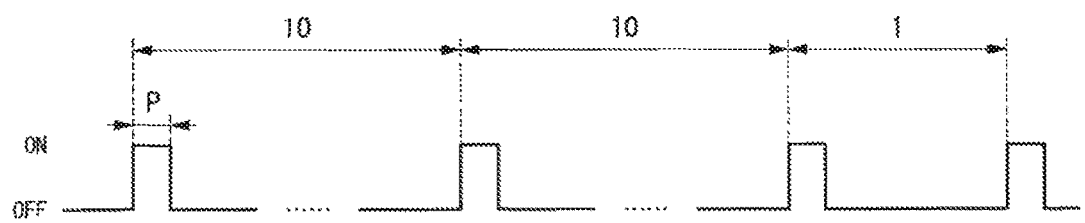

As described in aforementioned FIG. 2, the signal receiver 38 is set to the first cycle T1 or the second cycle T2 (a preset second period of time). FIG. 4 is a diagram illustrating the first cycle T1 and the second cycle T2. The upper diagram indicates the first cycle T1 in first mode, and the lower diagram indicates the second cycle T2 in second mode. In the example of FIG. 4, the second cycle T2 is ten times the cycle of the first cycle T1, for example. Hence, in second mode, power consumption by the control device 30 is suppressed, whereby deterioration of electric power of the battery 10 can be suppressed. Note that an operation period (P) in one cycle is the same in first mode and in second mode.

In addition, upon receipt of a transmission signal from the mobile terminal 100 in second mode, the controller 40 sets the cycle of operation of the signal receiver 38 to the first cycle T1 (or a cycle shorter than the second cycle T2) from the second cycle T2. This allows the vehicle control system 1 to receive transmission signals transmitted from the mobile terminal 100 more easily. Hereinafter, this processing will be described.

[Processing 2]

Figure 5:
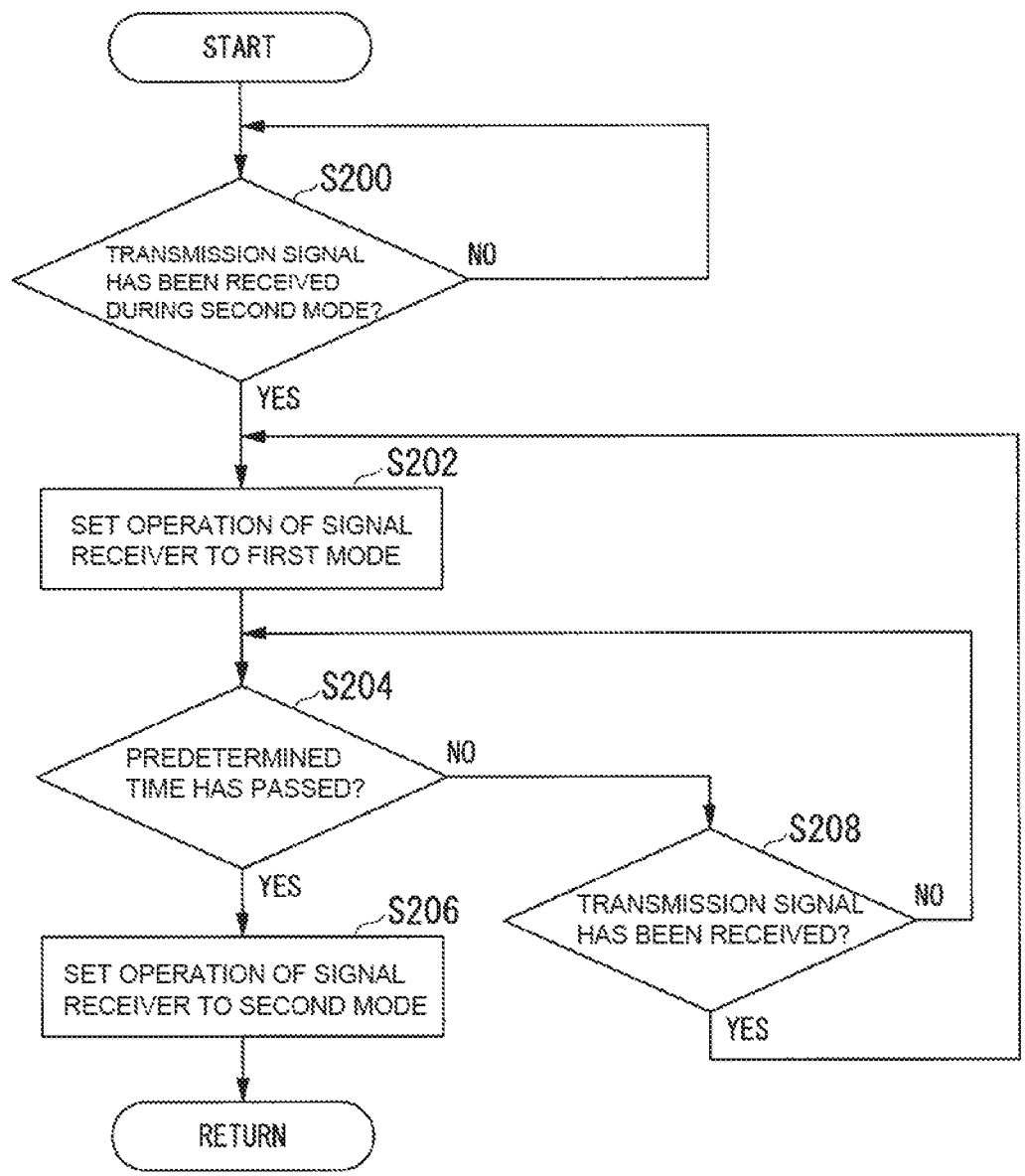
FIG. 5 is a flowchart illustrating a flow of processing performed by a controller 40 after a signal receiver 38 is set to second mode.

Upon receipt of a transmission signal transmitted by the mobile terminal 100 after setting the operation of the signal receiver 38 to second mode, the controller 40 sets the operation of the signal receiver 38 to first mode. FIG. 5 is a flowchart illustrating a flow of processing performed by the controller 40 after the operation of the signal receiver 38 is set to second mode.

First, the controller 40 determines whether a transmission signal has been received while the operation of the signal receiver 38 is set to second mode (step S200). If a transmission signal has been received, the controller 40 sets the operation of the signal receiver 38 to first mode (step S202). Next, the controller 40 determines whether a predetermined time has passed after setting the operation of the signal receiver 38 to first mode (step S204).

If the predetermined time has passed, the controller 40 sets the operation of the signal receiver 38 back to the cycle of second mode (step S206). If the predetermined time has not passed, the controller 40 determines whether a transmission signal transmitted by the mobile terminal 100 has been received (step S208). Note that in the processing of step S208, the controller 40 may determine whether the user has operated the control target of the load controller included in the load unit 60. In this case, if the user operation has been made, the processing proceeds to step S202, and if the user operation has not been made, the processing proceeds to step S204.

If the transmission signal has not been received, the processing returns to step S204, and if the transmission signal has been received, the processing returns to step S202. Thus, one routine of the flowchart is terminated.

The processing described above improves user convenience. For example, in first mode, a time during which the user presses a predetermined button of the mobile terminal 100 can be made shorter than in second mode. That is, since the operation cycle of the signal receiver 38 in first mode is shorter than the operation cycle of the signal receiver 38 in second mode, the signal receiver 38 can receive the transmission signal transmitted from the mobile terminal 100, even if the duration of the transmission signal is short.

Figure 6:
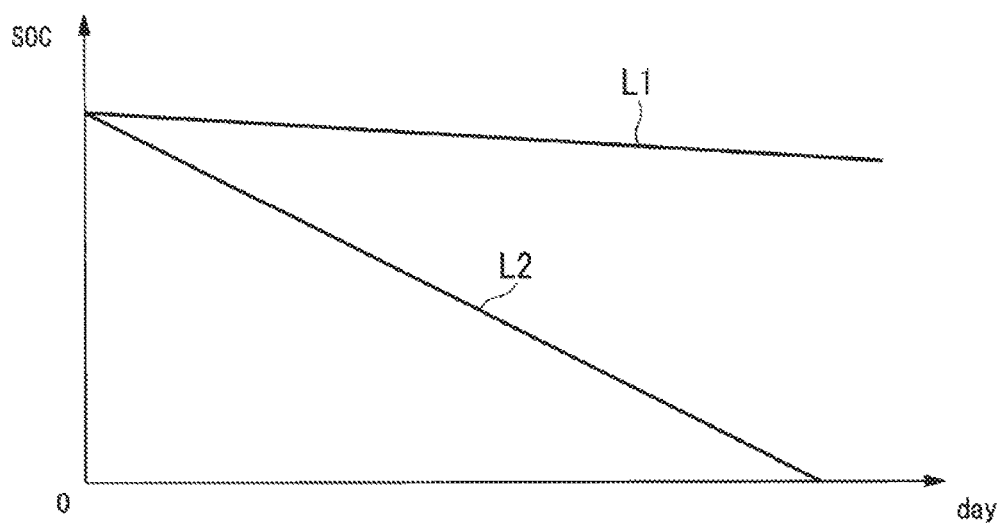
FIG. 6 is a diagram for comparing the transition of SOC of a battery of a vehicle in which second mode is set, and the transition of SOC of a battery of a vehicle in which second mode is not set.

FIG. 6 is a diagram for comparing the transition of SOC (State of Charge; the ratio of charge to the battery capacity) of a battery of a vehicle in which second mode is set, and the transition of SOC of a battery of a vehicle in which second mode is not set. In the example of FIG. 6, assume that the vehicle is controlled to maintain an OFF state instead of being controlled to an ignition-ON state or an accessory-ON state. In FIG. 6, the vertical axis indicates SOC, and the horizontal axis indicates the number of days. Additionally, a transition line L1 is a transition line of SOC of a battery mounted on the vehicle in which second mode is set, whereas a transition line L2 is a transition line of SOC of a battery mounted on the vehicle in which second mode is not set (e.g., first mode is set). As illustrated in FIG. 6, the degree of drop of SOC of the battery in which second mode is set is smaller than the degree of drop of SOC of the battery in which second mode is not set. In other words, the vehicle control system 1 of the embodiment can suppress decrease in SOC of the battery 10.

Application Example

Hereinafter, an exemplar application of the vehicle control system 1 of the embodiment will be described. For example, assume a case where several tens or several hundreds of vehicles are displayed at a car dealer. In such a case, in a vehicle control system of a comparative example, a fuse between a battery and a load unit may be disconnected to keep electric power of the battery from being supplied to the load unit and lowering SOC. When the fuse is disconnected, the battery and the load unit are brought out of conduction. Hence, decrease in SOC can be suppressed. However, in order for the salesperson to demonstrate functions (e.g., operational states of meters, audio, car navigation and the like) of the load unit (specific equipment) of the vehicle to the customer, the fuse needs to be connected to bring the battery and the load unit into conduction. Thus, it has been difficult in some cases to achieve both suppression of decrease in SOC and improvement in user convenience at a car dealer.

Figure 7:
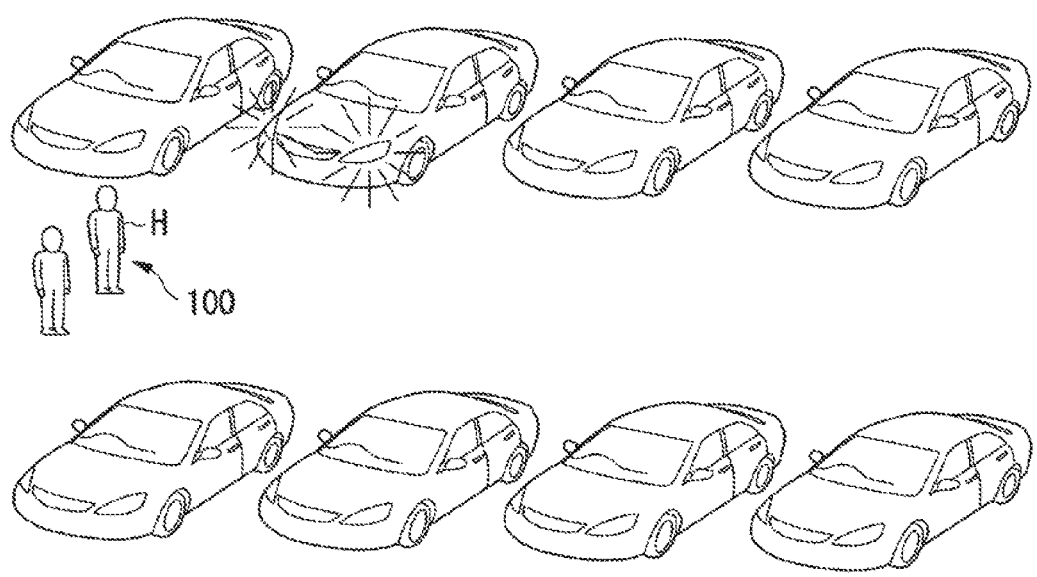
FIG. 7 is a diagram (No. 1) illustrating one application example.

Against this background, the vehicle control system 1 of the embodiment can achieve both suppression of decrease in SOC and improvement in user convenience. FIG. 7 is a diagram (No. 1) illustrating one application example. Second mode is set in the vehicle control system 1 of a vehicle displayed at a car dealer. Hence, SOC is suppressed. In addition, a salesperson H can unlock a door lock of the target vehicle or cause the target vehicle to answer back, by operating the mobile terminal 100. Accordingly, the salesperson H can easily recognize the target vehicle, and can also unlock the door lock of the target vehicle by remote control.

Moreover, upon receipt of a transmission signal, the vehicle control system 1 performs control to bring the battery 10 and the load unit 60 into conduction. Hence, the load controller can control the load. This enables control to turn on functions of the vehicle. As a result, the salesperson can promptly and easily demonstrate functions of the vehicle to the customer.

Figures 8, 9:
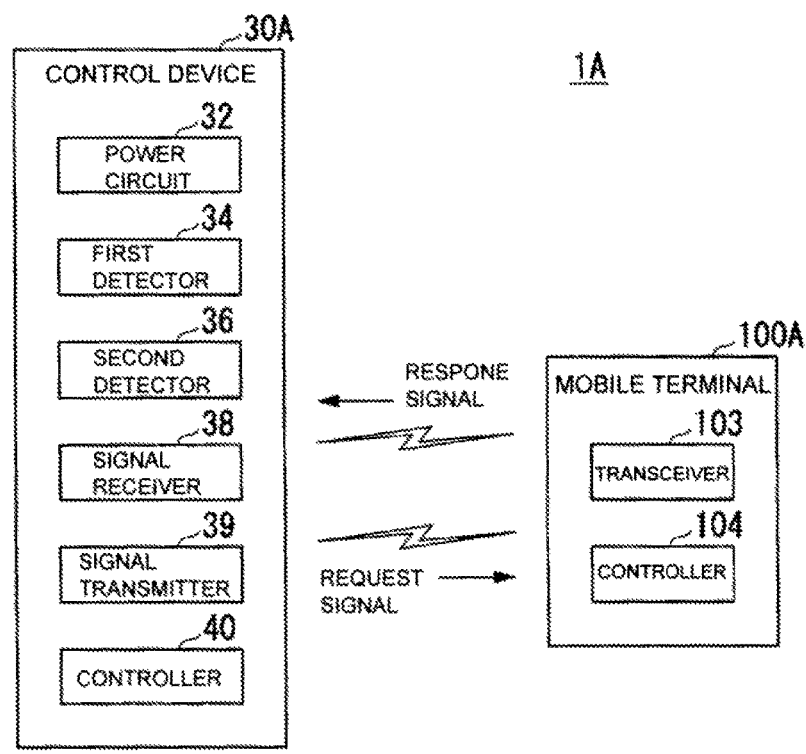
FIG. 8 is a diagram (No. 2) illustrating one application example.
FIG. 9 is a diagram illustrating a functional configuration of a control device 30A and a mobile terminal 100A of a vehicle control system 1A of a second embodiment.

FIG. 8 is a diagram (No. 2) illustrating one application example. For example, when a vehicle is manufactured at a plant and is shipped (factory default settings), the first fuse 12 and the second fuse 14 are disconnected. Then, the second fuse 14 is connected to set second mode at a car dealer. Accordingly, the vehicle can be displayed while suppressing decrease in SOC without decreasing user convenience. Thereafter, when the vehicle is bought by a customer and is to be used by the customer, the first fuse 12 is connected to set first mode. Thus, in the vehicle control system 1, the vehicle is controlled in states suitable for the environment, by setting first mode or second mode depending on the scene.

According to the first embodiment described above, the vehicle control system 1 can suppress power consumption without decreasing user convenience, by setting the cycle of intermittent reception of radio signals longer than the cycle of first mode.

Second Embodiment

Hereinafter, a second embodiment will be described. In the second embodiment, when a first fuse 12 is disconnected, a control device 30A that transmits a request signal to a mobile terminal 100A sets a longer transmission cycle of a request signal than when the first fuse 12 is connected. Hereinbelow, points different from the first embodiment will mainly be described.

FIG. 9 is a diagram illustrating a functional configuration of the control device 30A and the mobile terminal 100A of a vehicle control system 1A of the second embodiment. The control device 30A further includes a signal transmitter 39.

The signal transmitter 39 transmits a request signal that requests transmission of identification information to the mobile terminal 100A.

Upon receipt of a response signal, which is a response to the request signal, from the mobile terminal 100A after transmission of the request signal by the signal transmitter 39, a controller 40 performs communication processing between the mobile terminal 100A and the control device 30A. For example, the controller 40 determines whether identification information stored in a storage device of the control device 30A matches with the identification information included in the response signal transmitted from the mobile terminal 100A. If the pieces of identification information match, upon receipt of a signal indicating a predetermined instruction such as unlocking of a door lock from the mobile terminal 100A, the controller 40 controls parts to carry out the predetermined instruction (e.g., door lock unlocking instruction).

The mobile terminal 100A includes a transceiver 103 instead of the transmitter 102, for example. The transceiver 103 receives a request signal or the like transmitted by the control device 30A, and transmits a response signal or the like to the control device 30A, for example.

For example, a controller 104 normally performs control to bring the mobile terminal 100A to sleep mode, which is a power save mode. Upon receipt of a request signal from the control device 30A, the controller 104 performs control to bring the mobile terminal 100A to an operation mode from the sleep mode. In response to the request signal transmitted from the control device 30A, the controller 104 causes the transceiver 103 to transmit a response signal. A response signal is a signal that includes identification information stored in the storage device of the mobile terminal 100A.

In the second embodiment, the controller 40 sets the operation of the signal transmitter 39 to third mode if the first fuse 12 is connected, and sets the operation of the signal transmitter 39 to fourth mode if the first fuse 12 is disconnected.

Third mode is a mode in which the cycle of transmission of a request signal by the signal transmitter 39 is a first transmission cycle st1 (third cycle). In addition, third mode is a mode in which the cycle of operation of a signal receiver 38 is a first reception cycle rt1.

Fourth mode is a mode in which the cycle of transmission of a request signal by the signal transmitter 39 is a second transmission cycle st2 (fourth cycle) longer than the first transmission cycle st1. In addition, fourth mode is a mode in which the cycle of operation of the signal receiver 38 is a second reception cycle rt2 (sixth cycle) longer than the first reception cycle rt1 (fifth cycle).

Figure 10:
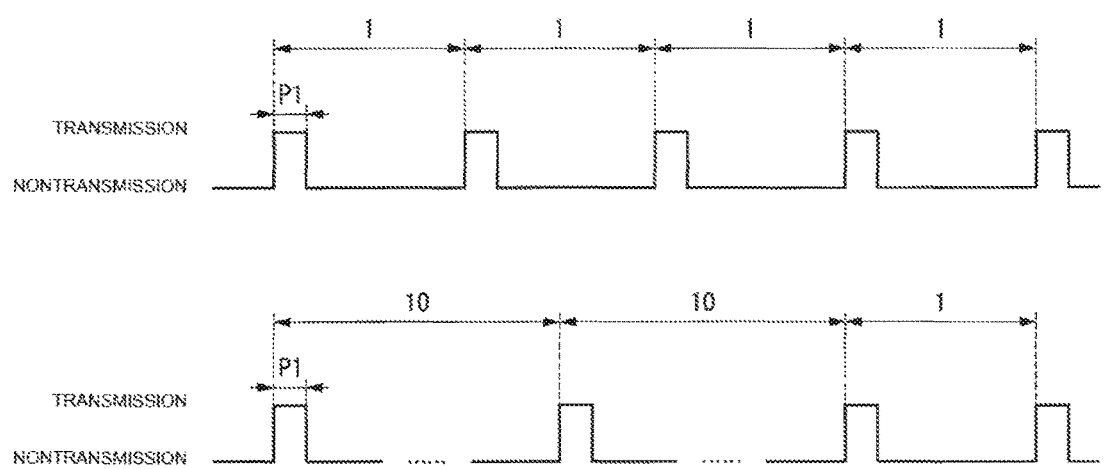
FIG. 10 is a diagram illustrating one example of transmission timings of a request signal.

FIG. 10 is a diagram illustrating one example of transmission timings of a request signal. In FIG. 10, "transmission" indicates timings of transmitting a request signal. The upper diagram indicates the first transmission cycle st1, and the lower diagram indicates the second transmission cycle st2. In the example of FIG. 10, the second transmission cycle st2 is ten times the cycle of the first transmission cycle st1, for example. Note that a duration (P1) of a request signal transmitted in one cycle is the same in third mode and in fourth mode.

Thus, the control device 30A can suppress power consumption of the battery 10, by setting the cycle of transmitting a request signal in fourth mode longer than the cycle of transmitting a request signal in third mode.

Additionally, upon receipt of a response signal from the mobile terminal 100A in fourth mode, the controller 40 performs control to bring a relay circuit into conduction. Then, after the controller 40 performs control to bring the relay circuit into conduction, when there is no user operation of a load of a load controller included in a load unit 60 for a predetermined time or longer, the controller performs control to bring the relay circuit out of conduction, and stops the supply of electric power to the load unit 60.

In addition, upon receipt of a response signal from the mobile terminal 100A in fourth mode, the controller 40 sets the cycle of transmission of a request signal by the signal transmitter 39 to the first transmission cycle st1 (or a cycle shorter than the second transmission cycle st2) from the second transmission cycle st2.

In addition, upon receipt of a response signal from the mobile terminal 100A in fourth mode, the controller 40 sets the cycle of operation of the signal receiver 38 to the first reception cycle rt1 (or a cycle shorter than the second reception cycle rt2) from the second reception cycle rt2.

According to the second embodiment described above, the vehicle control system 1A can suppress power consumption without decreasing user convenience, by setting the cycle of intermittent transmission of request signals to the outer side of the vehicle in fourth mode longer than the cycle of third mode.

Third Embodiment

Hereinafter, a third embodiment will be described. The third embodiment differs from the first embodiment in circuit configuration. Hereinbelow, this difference will mainly be described.

Figure 11:
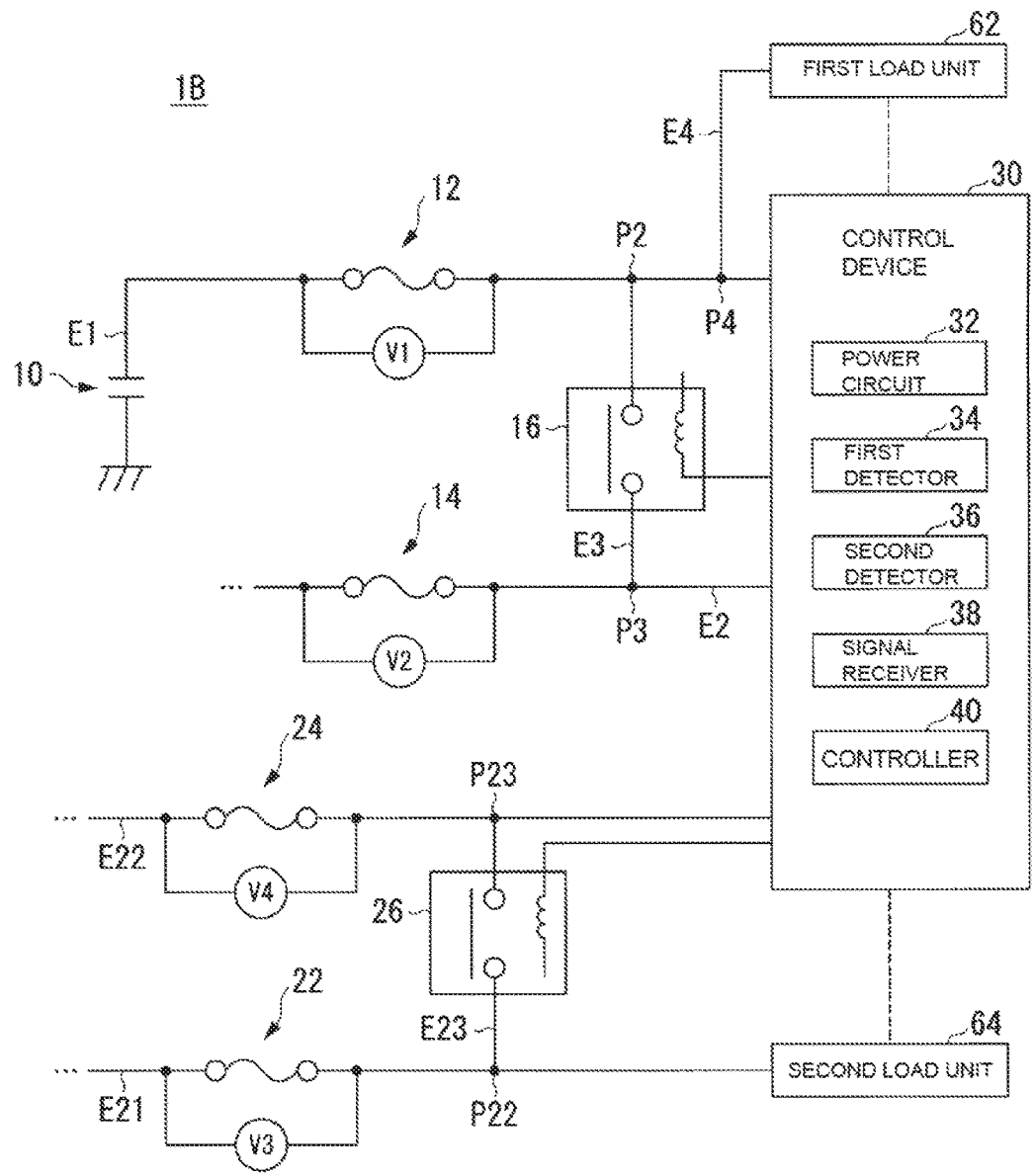
FIG. 11 is a diagram illustrating one example of a functional configuration of a vehicle control system 1B of a third embodiment.

FIG. 11 is a diagram illustrating one example of a functional configuration of a vehicle control system 1B of the third embodiment. In FIG. 11, a response controller 50 and a mobile terminal 100 are omitted. For example, the vehicle control system 1B includes a first voltage detector V1, a second voltage detector V2, a third voltage detector V3, a fourth voltage detector V4, a battery 10, a first fuse 12, a second fuse 14, a relay circuit 16, a 22nd fuse 22, a 24th fuse 24, a relay circuit 26, a control device 30, a first load unit 62, and a second load unit 64.

The vehicle control system 1B also has a first feed line E1, a second feed line E2, a third feed line E3, a fourth feed line E4, a 21st feed line E21, a 22nd feed line E22, and a 23rd feed line E23.

One end of the fourth feed line E4 is connected to a meeting point P4, and the other end is connected to the first load unit 62. The first load unit 62 includes a first load controller and a first load. The first load is meters, a wiper, or a door lock unit, for example. The first load controller controls the first load.

The 22nd fuse 22, the third voltage detector V3, and the second load unit 64 are connected to the 21st feed line E21. The second load unit 64 includes a second load controller and a second load. The second load is audio or a car navigation system, for example. The second load controller controls the second load.

One end of the 21st feed line E21 is connected to the positive side of the battery 10, and the other end is connected to the second load unit 64. In the 21st feed line E21, a meeting point P22 is provided between the 22nd fuse 22 and the second load unit 64.

The 24th fuse 24, the fourth voltage detector V4, and the control device 30 are connected to the 22nd feed line E22. One end of the 22nd feed line E22 is connected to the positive side of the battery 10, and the other end is connected to the control device 30. In the 22nd feed line E22, a meeting point P23 is provided between the 24th fuse 24 and the control device 30.

One end of the 23rd feed line E23 is connected to the meeting point P22, and the other end is connected to the meeting point P23. The relay circuit 26 is a circuit that is controlled and brought into conduction according to a control signal output by the control device 30. Note that the 22nd fuse 22 or the 24th fuse 24 is a fuse that is connected and disconnected to and from the feed line by a user.

The third voltage detector V3 detects a voltage applied to the 22nd fuse 22, and outputs the detection result to the control device 30. A first detector 34 detects whether the 22nd fuse 22 is connected, based on the detection result of the third voltage detector V3. The fourth voltage detector V4 detects a voltage applied to the 24th fuse 24, and outputs the detection result to the control device 30. A second detector 36 detects whether the 24nd fuse 24 is connected, based on the detection result of the fourth voltage detector V4. Upon receipt of a transmission signal from the mobile terminal 100, a controller 40 performs control to bring the relay circuit 16 and the relay circuit 26 into conduction.

First mode is a mode that is set with the first fuse 12 connected to the first feed line E1, and the 22nd fuse 22 connected to the 21st feed line E21. Second mode is set when the following conditions (1) to (4) are met. (1) The first fuse 12 is disconnected from the first feed line E1. (2) The 22nd fuse 22 is disconnected from the 21st feed line E21. (3) The second fuse 14 is connected to the second feed line E2. (4) The 24th fuse 24 is connected to the 22nd feed line E22. Note that one or both of (1) and (2) do not necessarily have to be satisfied.

According to the third embodiment described above, in the vehicle control system 1B, second mode can be set even when a large amount of electric power is consumed in the first load unit 62 and the second load unit 64, and the first load unit 62 and the second load unit 64 need to be connected to different feed lines. Hence, power consumption can be suppressed without decreasing user convenience.

Although the modes for carrying out the present invention have been described by use of the embodiments, the invention is not limited in any way to the embodiments, and various modifications and replacements can be made without departing from the gist of the invention.

The invention claimed is:

1. A vehicle control system comprising:
   a first power line that is connectable with a first fuse and feeds electric power from a battery to a controller;
   a second power line that is connectable with a second fuse and feeds electric power from said battery to said controller;
   a first detector configured to detect whether said first fuse is connected to said first power line;
   a second detector configured to detect whether said second fuse is connected to said second power line;
   a receiver configured to intermittently receive signals from a mobile terminal in a cycle of a preset period of time; and
   said controller configured to control operations of equipment of a vehicle upon detection of said receipt of said signals by said receiver, wherein
   said controller is configured to
      set said cycle of operation of said receiver to a first cycle when said first detector detects that said first fuse is connected to said first power line, and
      set said cycle of operation of said receiver to a second cycle longer than said first cycle, when it is detected that said first fuse is not connected to said first power line, and said second detector detects that said second fuse is connected to said second power line.

2. The vehicle control system according to claim 1, wherein
said equipment of the vehicle comprises a load controller connected to said first power line, and
when said receiver receives said signals from said mobile terminal in a state where the cycle of operation of said receiver is set to the second cycle, said controller causes said electric power to be supplied to said load controller connected to said first power line, from said second power line.

3. The vehicle control system according to claim 1, wherein
when said receiver receives said signals from said mobile terminal in a state where the cycle of operation of said receiver is set to the second cycle, said controller sets the cycle of operation of said receiver to a cycle shorter than said second cycle.

4. The vehicle control system according to claim 3, wherein
when a state where no signal is received from said mobile terminal continues for a predetermined time or longer after setting the cycle of operation of said receiver to the cycle shorter than said second cycle, said controller sets the cycle of operation of said receiver to said second cycle.

5. The vehicle control system according to claim 2, wherein
when no operation by a user on a control target of said load controller is detected continuously for a predetermined time or longer in a state where electric power is supplied to said load controller from said second power line, said controller stops the supply of electric power to said load controller from said second power line.

6. The vehicle control system according to claim 1, further comprising:
a relay line that comprises a relay circuit provided in said first power line between a part where said first fuse is connectable and said controller, and in said second power line between a part where said second fuse is connectable and said controller, wherein
said equipment comprises a load controller connected to said first power line between the part where said first fuse is connectable and said controller, and
said relay circuit is controlled and turned on, to allow supply of said electric power to the load controller connected to said first power line from said second power line.

7. A vehicle control system comprising:
a first power line that is connectable with a first fuse and feeds electric power from a battery to a controller;
a second power line that is connectable with a second fuse and feeds electric power from said battery to said controller;
a first detector configured to detect whether said first fuse is connected to said first power line;
a second detector configured to detect whether said second fuse is connected to said second power line;
a transmitter configured to intermittently transmit request signals to a mobile terminal outside of a vehicle in a cycle of a preset period of time;
a receiver configured to receive a signal sent from said mobile terminal in a response to said request signal; and
said controller configured to control operations of equipment of said vehicle upon receipt of said signal by said receiver, wherein
said controller is configured to
set said cycle of intermittent transmission of request signals to the outside of the vehicle by said transmitter to a third cycle when said first detector detects that said first fuse is connected to said first power line, and
set said cycle of the intermittent transmission of request signals to the outside of the vehicle by said transmitter to a fourth cycle longer than said third cycle, when it is detected that said first fuse is not connected to said first power line, and said second detector detects that said second fuse is connected to said second power line.

8. The vehicle control system according to claim 7, wherein
said receiver operates intermittently while request signals are transmitted by said transmitter,
when the cycle of transmission of request signals by said transmitter is set to said third cycle, said controller sets the cycle of operation of said receiver to a fifth cycle, and when the cycle of transmission of request signals by said transmitter is set to said fourth cycle, said controller sets the cycle of operation of said receiver to a sixth cycle longer than said fifth cycle that was set when the cycle of transmission of request signals by said transmitter was set to said third cycle.

9. The vehicle control system according to claim 7, wherein
said equipment of the vehicle comprises a load controller connected to said first power line, and
when said receiver receives said signal from said mobile terminal in a state where the cycle of transmission of request signals by said transmitter is set to the fourth cycle, said controller causes said electric power to be supplied to said load controller connected to said first power line, from said second power line.

10. The vehicle control system according to claim 7, wherein
when said receiver receives said signal from said mobile terminal in a state where the cycle of transmission of request signals by said transmitter is set to the fourth cycle, said controller sets the cycle of transmission of request signals by said transmitter to a cycle shorter than said fourth cycle.

11. The vehicle control system according to claim 10, wherein
when a state where no signal is received from said mobile terminal continues for a predetermined time or longer after setting the cycle of transmission of request signals by said transmitter to the cycle shorter than said fourth cycle, said controller sets the cycle of transmission of request signals by said transmitter to said third cycle.

* * * * *